United States Patent [19]

Bendickson et al.

[11] Patent Number: 4,863,267
[45] Date of Patent: Sep. 5, 1989

[54] FIBER OPTIC TOE/TRACK MEASUREMENT SYSTEM

[75] Inventors: Roy B. Bendickson, Wausau; Edward S. Wahoski; Michael A. Norris, both of Kenosha, all of Wis.

[73] Assignee: Snap-on Tools Corporation, Kenosha, Wis.

[21] Appl. No.: 102,579

[22] Filed: Sep. 29, 1987

[51] Int. Cl.$^4$ ............................................. G01B 11/275
[52] U.S. Cl. ........................................ 356/155; 33/288
[58] Field of Search ............... 356/152, 153, 138, 155, 356/154; 33/288, 203.1

[56] References Cited

U.S. PATENT DOCUMENTS

| | | |
|---|---|---|
| 3,278,739 | 10/1966 | Royka et al. |
| 3,805,048 | 4/1974 | Brennesholtz |
| 3,953,134 | 4/1976 | Appel et al. |
| 4,097,157 | 6/1978 | Lill |
| 4,115,926 | 9/1978 | Hampton, Jr. et al. |
| 4,130,362 | 12/1978 | Lill et al. |
| 4,150,897 | 4/1979 | Roberts, Jr. et al. |
| 4,154,531 | 5/1979 | Roberts, Jr. et al. |
| 4,168,909 | 9/1979 | Knudsen et al. |
| 4,249,824 | 2/1981 | Wiederrich et al. ................ 356/155 |
| 4,402,603 | 9/1983 | Lill |
| 4,500,201 | 2/1985 | Lill ................................... 356/155 |
| 4,578,870 | 4/1986 | Cooke ................................ 356/155 |
| 4,615,618 | 10/1986 | Bailey et al. ...................... 356/155 |

OTHER PUBLICATIONS

Ammco Brochure No. 2621 for Ammco Trac-4 Kit for the 2610 Toe Gauge.
Ammco Brochure for Optical Toe Gauge Models 2610 and 2610-22.

Primary Examiner—F. L. Evans
Attorney, Agent, or Firm—Emrich & Dithmar

[57] ABSTRACT

An optical toe/track measurement system includes a pair of toe gauge assemblies respectively mountable on the two wheels at one end of a motor vehicle and a pair of track scale assemblies respectively mountable on the other two wheels of the vehicle. Each toe gauge assembly includes an elongated tubular housing having toe and track projection systems for respectively projecting toe and track light beams from the opposite ends of the housing, the track beam being projected coaxially with the housing onto the track scale on the same side of the vehicle, while the toe beam is projected perpendicular to the longitudinal axis of the housing onto a scale carried by the toe gauge assembly on the other side of the vehicle. Light is supplied respectively to the two toe gauge assemblies throught two fiber optic cables from a single remote light source. Each fiber optic cable has an input end which plugs into a receptacle in the source enclosure and a bifurcated output end which is optically coupled to both of the projection systems in the associated toe gauge assembly.

20 Claims, 6 Drawing Sheets

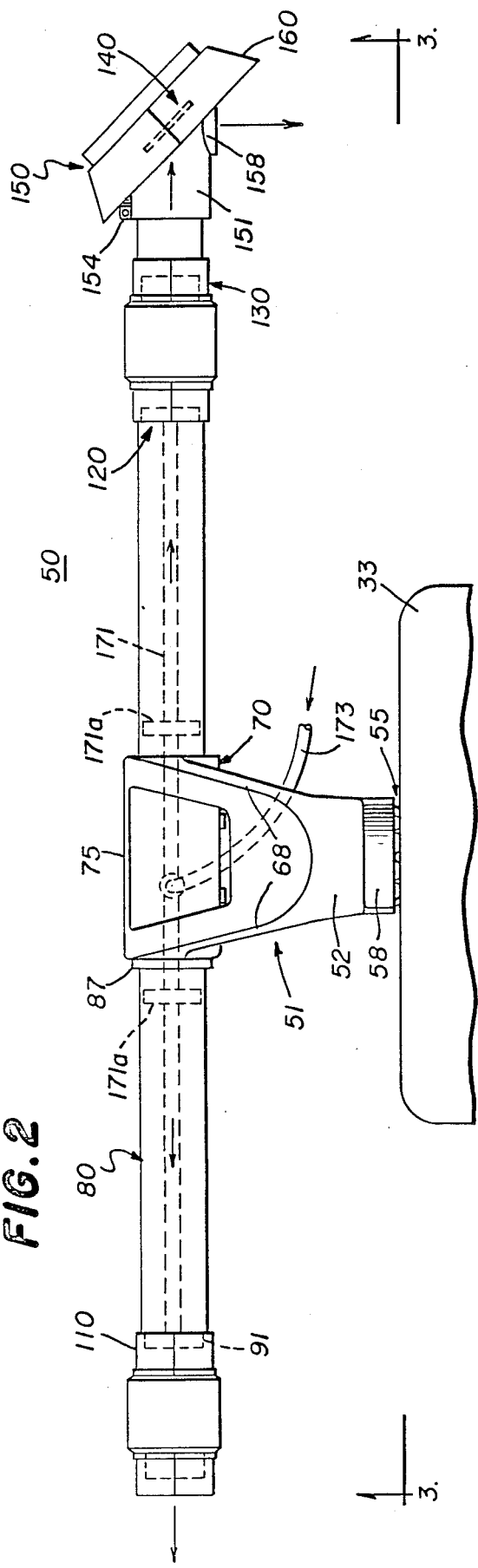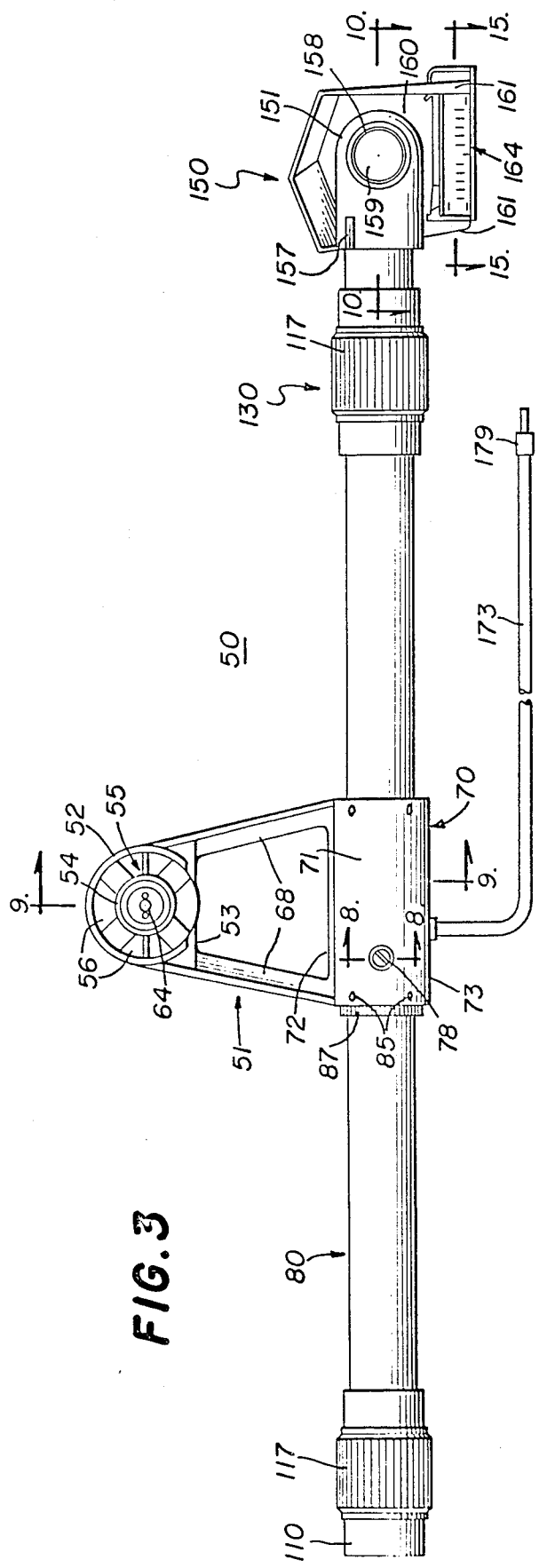

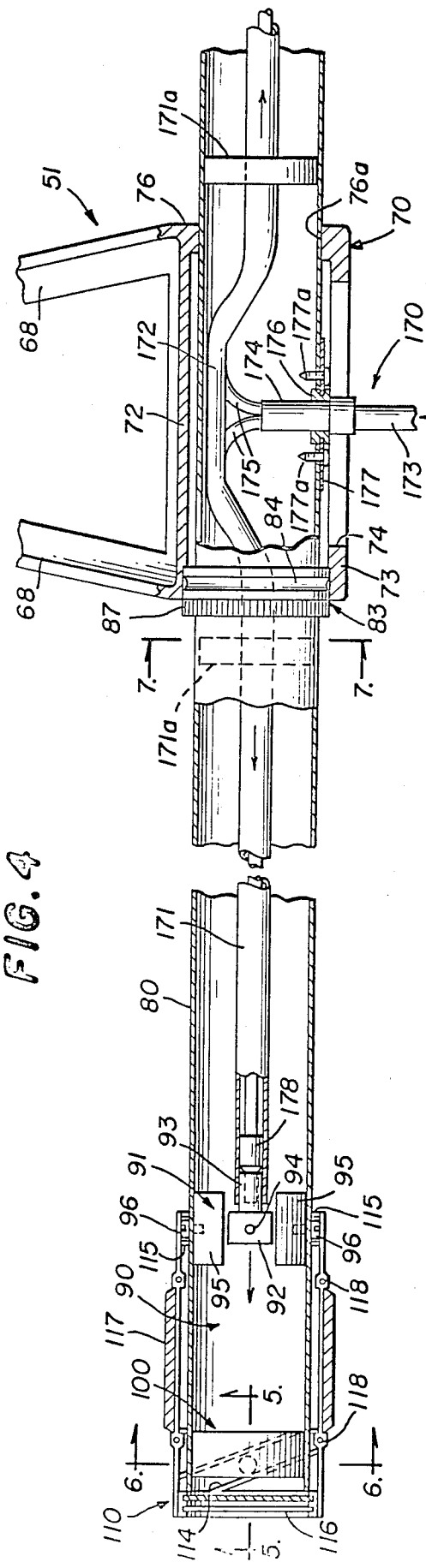

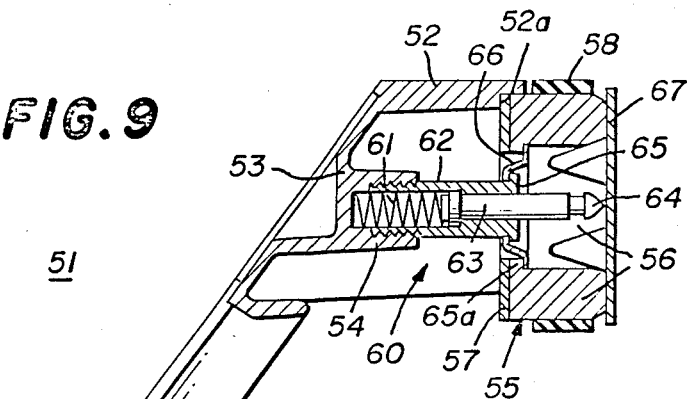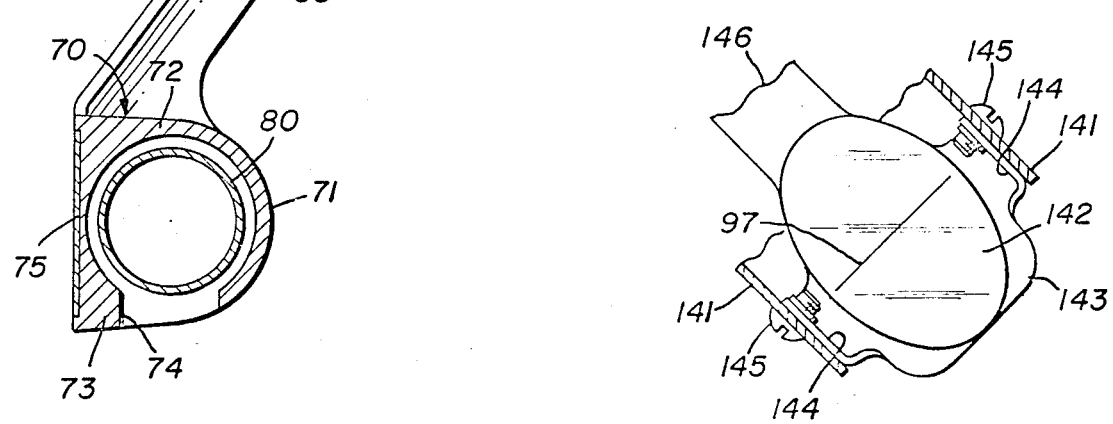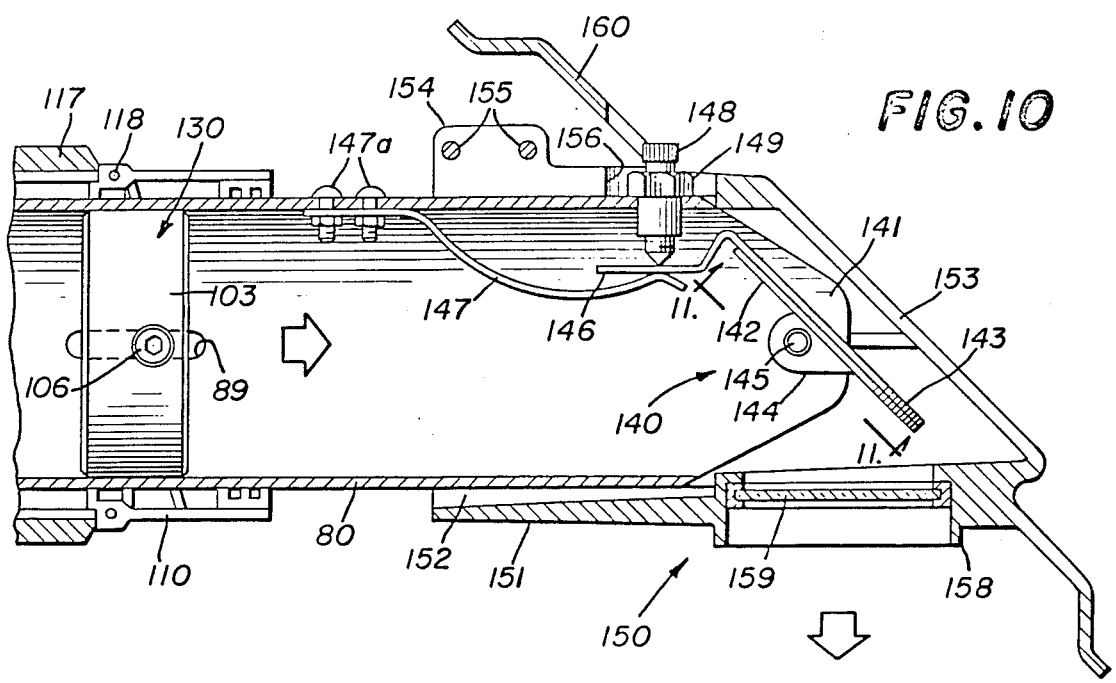

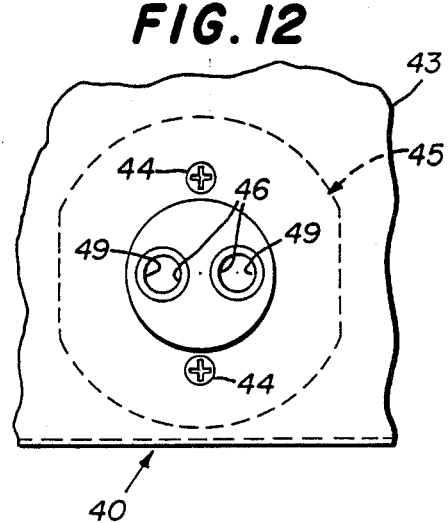
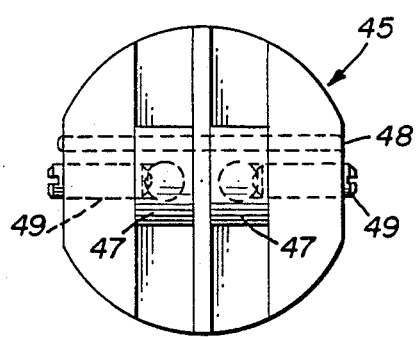
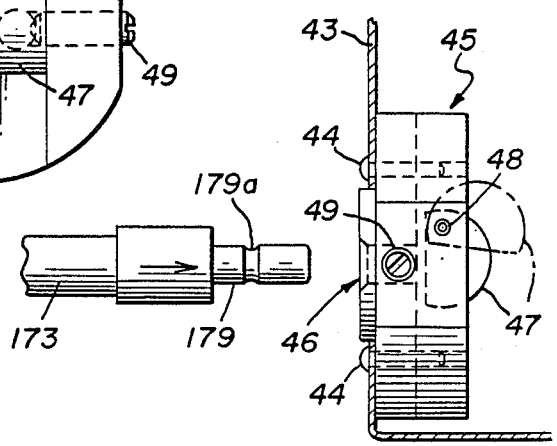
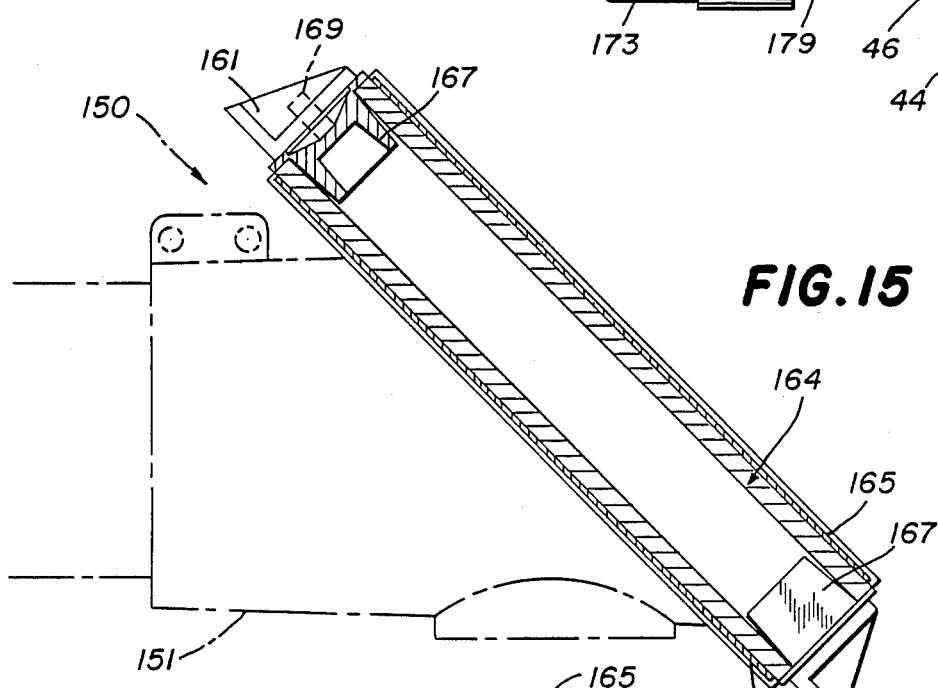
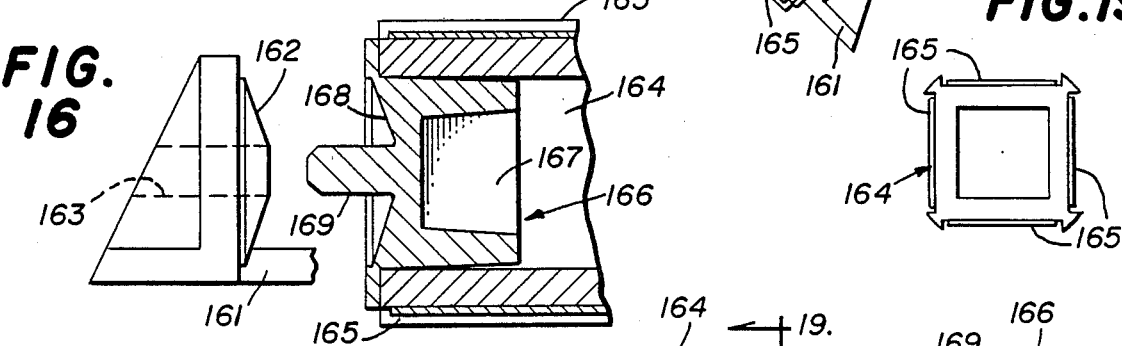
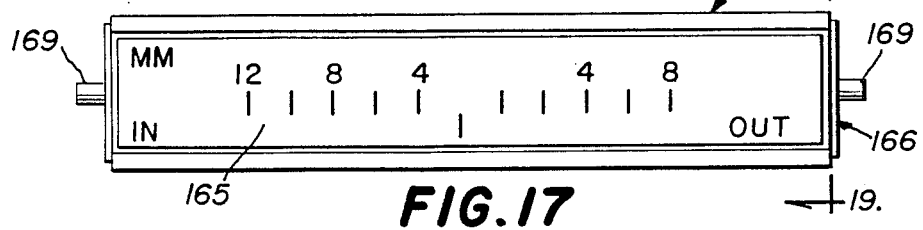
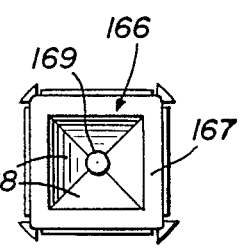

FIBER OPTIC TOE/TRACK MEASUREMENT SYSTEM

BACKGROUND OF THE INVENTION

This invention relates to systems for aligning the wheels of a motor vehicle, relating particularly to systems for measuring the toe and track of the vehicle wheel assemblies.

Toe and track are both related to the geometric center line of the vehicle, which is defined as the straight line extending between the midpoint of the front axle or wheel assembly and the midpoint of the rear axle or wheel assembly. Toe is the angle at which the front or steerable wheel points toward or away from the vehicle's geometric center line, i.e., it is the angle between the geometric center line and the plane of rotation of the wheel. If the front of the wheel points toward the center line, toe is positive and the condition is called "toe-in". If the front of the wheel points away from the center line toe is negative and the condition is known as "toe-out". If the wheel is parallel with the center line, toe is 0.

The thrust line is a line passing through the rear axle midway between the two wheels and perpendicular thereto. The track is true when the thrust line lies along the geometric center line of the vehicle.

Prior art alignment systems have typically been provided with two toe gauge assemblies which attach to the hubs of the wheels of a vehicle. Each such toe gauge assembly includes a housing which has mounted therein a light source and projection means for projecting a light beam onto a scale carried by the other toe gauge assembly, which is mounted on another wheel at the same end of the vehicle. In some cases each assembly also projects a second beam onto a track scale carried by another wheel on the same side of the vehicle.

In such prior systems, the heat generated from the internally mounted light source can cause distorted images and miscalibration resulting from expansion of the toe gauge assembly materials, with resultant inaccurate readings.

Also, in those systems which project both toe and track beams, it is often necessary for the user to switch the light source between the two projection directions.

SUMMARY OF THE INVENTION

It is a general object of the present invention to provide an improved toe/track measurement system which avoids the disadvantages of prior systems while affording additional structural and operating advantages.

An important feature of the invention is the provision of an optical toe/track measurement system which avoids thermal distortion.

Another feature of the invention is the provision of a toe/track measurement system of the type set forth, which provides a single light source for the entire system, while avoiding switching of the source among projection directions.

In connection with the foregoing feature, it is another feature of the invention to provide a toe/track measurement system of the type set forth which utilizes fiber optic light transmission techniques.

Still another feature of the invention is the provision of a toe/track alignment system of the type set forth which is of simple and economical construction.

Yet another feature of the invention is the provision of a toe/track alignment measurement system of the type set forth which is safe and easy to use and maintain.

These and other features of the invention are attained by providing apparatus for measuring wheel alignment of a motor vehicle comprising: a light source; light projection means; means for mounting the light projection means on one wheel of the vehicle in a predetermined position and orientation; scale means mountable on another wheel of the vehicle; and fiber optic means for transmitting light from the source to the projection means, the projection means being responsive to light from the fiber optic means for forming a light beam and projecting it onto the scale means.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 2 is a top plan view of a toe gauge assembly of the system of FIG. 1 which is disposed on the left front wheel of the vehicle;

FIG. 3 is a side elevational view of the toe gauge assembly of FIG. 2, taken generally along the line 3—3 therein;

FIG. 4 is an enlarged fragmentary view of the toe gauge assembly of FIG. 3, in partial vertical section;

FIG. 5 is a further enlarged fragmentary view of one of the focusing lens assemblies of the toe gauge assembly of FIG. 4, taken along the line 5—5 therein;

FIG. 6 is a still further enlarged view of the focusing assembly of FIG. 5, taken along the line 6—6 of FIG. 4;

FIG. 7 is an enlarged fragmentary view in vertical section taken along the line 7—7 in FIG. 4;

FIG. 8 is an enlarged fragmentary view in vertical section taken along the line 8—8 in FIG. 3;

FIG. 9 is an enlarged view in vertical section taken along the line 9—9 in FIG. 3;

FIG. 10 is an enlarged fragmentary view in horizontal section taken along the line 10—10 in FIG. 3;

FIG. 11 is a fragmentary sectional view taken along the line 11—11 in FIG. 10;

FIG. 12 is an enlarged, fragmentary front elevational view of the fiber optic cable receptacles on the light source of the system of FIG. 1;

FIG. 13 is a rear elevational view of the receptacles of FIG. 12;

FIG. 14 is a fragmentary side elevational view of the receptacle assembly of FIG. 12, illustrating the manner of cooperation with an associated fiber optic cable plug;

FIG. 15 is an enlarged fragmentary view in horizontal section taken along the line 15—15 in FIG. 3;

FIG. 16 is a further enlarged fragmentary view in partial vertical section of the upper left-hand portion of the scale assembly illustrated in FIG. 15, illustrating the manner of mounting of the scale tube;

FIG. 17 is a side elevational view of one face of the scale tube of the scale assembly of FIG. 15;

FIG. 18 is an end elevational view of the right-hand end of the scale tube, as illustrated in FIG. 17;

FIG. 19 is an end elevational view of the right-end of the scale tube of FIG. 17, taken generally along the line 19—19 therein, with the end plug removed;

DESCRIPTION OF THE PREFERRED EMBODIMENT

Figure 1:
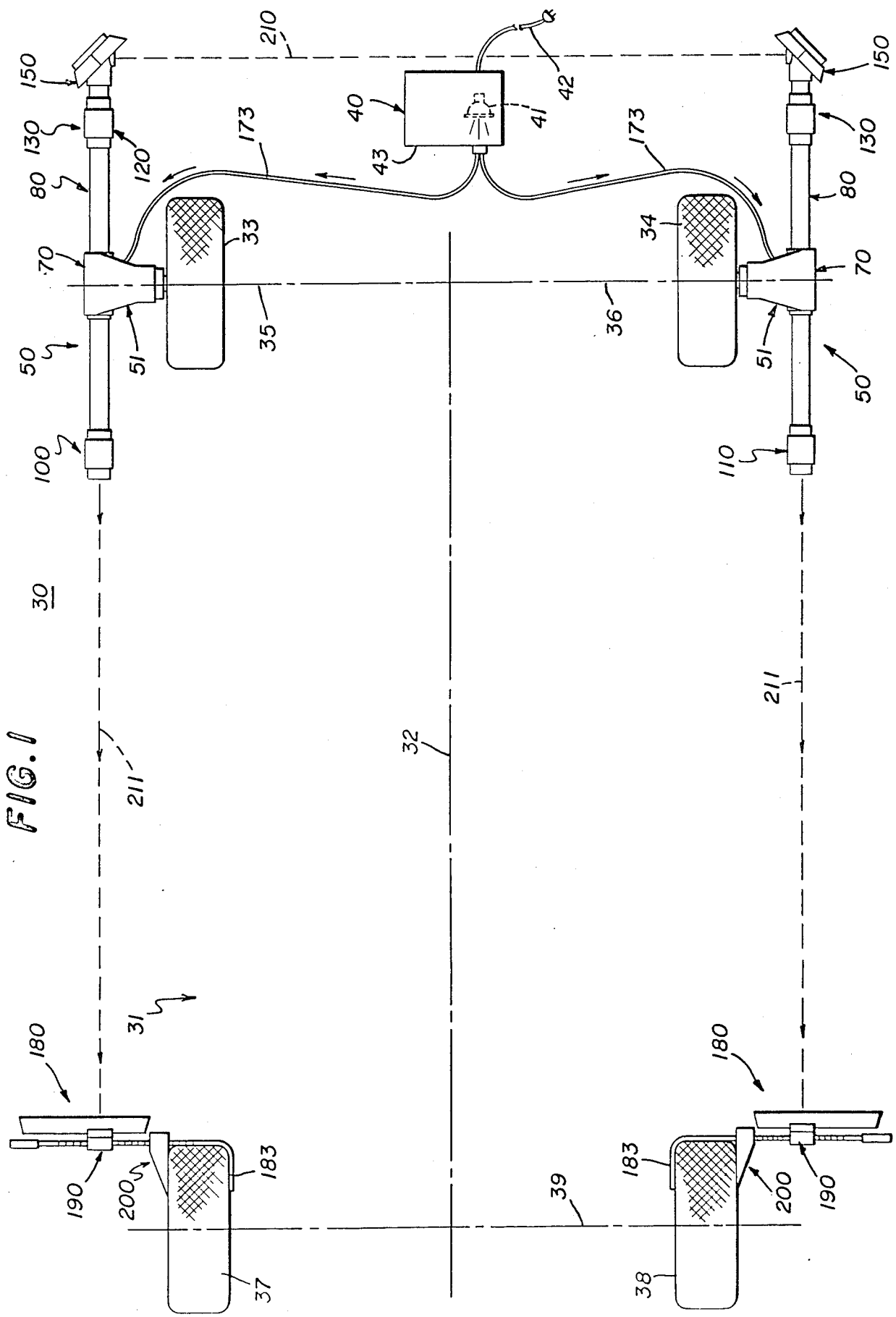
FIG. 1 is a top plan view of the toe/track measurement system of the present invention, illustrated in the configuration in which it is used on a diagrammatic representation of an associated vehicle.

Referring to FIG. 1, there is illustrated a fiber optic toe/track measurement system, generally designated by the numeral 30, constructed in accordance with and embodying the features of the present invention. The measurement system 30 is utilized for making toe and track wheel alignment measurements on a motor vehicle 31, and is illustrated in the configuration in which it is used with respect to such a vehicle. The vehicle 31 is diagrammatically illustrated and has a geometric longitudinal center line 32, which is disposed midway between a pair steerable front wheels 33 and 34, respectively having movable axes of rotation 35 and 36, and a pair of non-steerable rear wheels 37 and 38 typically having a common axis of rotation 39. If the wheels of the vehicle 31 are properly aligned, then (1) when the front wheels 33 and 34 are directed straight ahead, a line interconnecting the centers of the front wheels 33 and 34 will be parallel to the axis of rotation 39 of the rear wheels 37 and 38, and (2) the thrust line of the vehicle 31, which is defined as the line perpendicular to the rear axle of the vehicle and located midway between the rear wheels, will lie along the geometric center line 32. The toe of a wheel is the angle that the plane of the wheel makes with the geometric center line 32. If the toe is correct it will conform to the manufacturer's specifications. The measurement system 30 is utilized to determine whether or not the toe and track of the vehicle 31 are correct.

The measurement system 30 is an optical system and is provided with a light source enclosure 40 in which is mounted a suitable light source, such as a lamp 41. The light source enclosure 40 is provided with a plug 42 for plugging into an associated AC receptacle for powering the lamp 41. Referring to FIGS. 12-14, the light source enclosure 40 is generally in the form of a rectangular box and has an upstanding front wall 43. Mounted behind the front wall 43 by means of mounting screws 44 is a receptacle assembly 45 having a pair of receptacles or sockets 46 which align with complementary openings in the front wall 43. The rear or inner ends of the receptacles 46 are closed, respectively, by cams 47 which are pivotally movable on a pin 48 between a closed condition, illustrated in solid line in FIG. 13 and in part-solid and part-dashed line in FIG. 14, for closing the receptacles 46, and an open condition, illustrated in phantom line in FIG. 14, for opening the receptacles 46. The receptacles 46 are positioned directly in front of the lamp 41, so that when the cams 47 are in their open conditions, light from the lamp 41 passes through the receptacles 46. The light source enclosure 40 is also provided with a pair of ball plunger assemblies 49 which respectively project radially into the receptacles 46 from the outer sides thereof, the ball plunger assemblies 49 being of standard construction and including a ball plunger which is depressible against the urging of a compression spring (not shown), for a purpose to be explained more fully below.

The measurement system 30 also includes a pair of toe gauge assemblies 50 (FIG. 1) which are constructed as mirror images of each other and, therefore, only one will be described in detail. Referring now also to FIGS. 2, 3 and 9, each toe gauge assembly 50 includes a mounting bracket 51 which has a part-cylindrical magnet housing 52, open at the forward end thereof and closed at the rear end thereof by a web 53. Integral with the web 53 and projecting forwardly therefrom substantially coaxially with the magnet housing 52 is a cylindrical socket 54. Received in the front end of the magnet housing 52 against a shoulder 52a thereof is an annular permanent magnet 55 having a plurality of circumferentially spaced apart lobes 56, preferably four in number. A washer 57 is disposed between the magnet 55 and the shoulder 52a, and a rubber sleeve 58 encircles the magnet 55.

Also disposed within the magnet housing 52 is a plunger assembly 60 which includes a helical compression spring 61 seated in the socket 54, and a tubular collar 62 which is threadedly engaged in the socket 54 coaxially therewith and receives the spring 61 therein. Disposed in the forward end of the collar 62 is a plunger 63 which bears against the spring 61 and has an enlarged inner end which bears against a cooperating shoulder in the collar 62 to limit outward movement of the plunger 63. The plunger 63 has a tip 64 disposed for alignment with cooperating structure on the hub of the vehicle wheels 33 and 34, in a known manner. The outer end of the collar 62 projects slightly into the magnet 55 coaxially therewith and is centered with respect thereto by a washer 66 which bears against flanges 65 and 65a on the collar 62 and the magnet 55, respectively. A keeper plate 67 may be magnetically held against the outer end of the magnet 55 for protecting it, when the toe gauge assembly 50 is not in use.

Referring now also to FIGS. 4 and 7-9, the mounting bracket 51 includes a pair of struts 68 which extend between the magnet housing 52 and a tube housing 70. The tube housing 70 forms a generally tubular enclosure which has a part-cylindrical front wall 71 which is integral with flat and slightly rearwardly diverging top and bottom walls 72 and 73. The bottom wall 73 has a rectangular aperture 74 (FIG. 4) therein centrally thereof, and the rear of the tube housing 70 is enclosed by a cover plate 75 (FIG. 9). The tube housing 70 has end walls 76 (FIGS. 4 and 7) having formed therein coaxial circular openings 76a and 76b of slightly different diameters. An internally threaded radial bore 77 is formed in the part-cylindrical wall 71 of the tube housing 70 (FIG. 8) and receives therein a set screw 78 (FIGS. 3 and 8) having a reduced-diameter inner tip 79.

In use, the tip 79 of the set screw 78 extends radially inwardly through a narrow circumferentially extending slot 81 in the wall of an elongated tube 80, which extends through the tube housing 70 and through the circular openings 76a and 76b therein. Thus, the tip 79 prevents longitudinal movement of the tube 80 with respect to the tube housing 70. An O-ring 82 encircles the tip 79 of the set screw 78 and bears against the outer surface of the tube 80, as illustrated in FIG. 8, so that when the set screw 78 is turned in a sufficient distance it will cooperate with the O-ring 82 to frictionally hold the tube 80 against accidental rotation about its longitudinal axis. Preferably, the set screw 78 is set so that the pressure on the O-ring 82 is such as to accommodate manual rotational movement of the tube 80 in the direction indicated by the arrows in FIG. 8, the rotational movement being limited by engagement of the tip 78 against the ends of the slot 81.

The opening 76a in the tube housing end wall 76 is very slightly greater than the outer diameter of the tube 80, so as to position the tube 80, while accommodating rotational movement thereof about its axis. The opening 76b has a diameter substantially greater than the outer diameter of the tube 80, and has received therein an eccentric collar 83 (FIGS. 4 and 7) having a circumferential groove 84 in the outer surface thereof for receiving therein the inner ends of two set screws 85 which extend through complementary radial threaded holes in the part-cylindrical wall 71 of the tube housing 70. The eccentric collar 83 has an eccentric bore 86 therethrough having a diameter very slightly greater than the outer diameter of the tube 80. The collar 83 has a knurled finger grip portion 87 which projects outwardly beyond the adjacent end wall 76 of the tube housing 70 for access by a user. Thus, it will be appreciated that when the set screws 85 are released, the eccentric collar 83 can be manually rotated by use of the knurled portion 87 to laterally shift the position of the elongated tube 80 with respect to the tube housing 70. The tube 80 is provided, respectively adjacent to the opposite ends thereof, with two pairs of elongated focusing slots 88 and 89 (see FIGS. 5 and 10), with the slots of each pair being disposed in diametrically opposed locations, for a purpose to be explained more fully below.

Mounted within the tube 80 adjacent to the rear end thereof is a track projection assembly 90 (see FIG. 4), which includes a reticle assembly 91 and a focus lens assembly 100. The reticle assembly 91 includes an elongated rectangular body 92 which extends across the inside of the tube 80 and is fixed thereto by screws 94 (one shown), the body 92 having a central bore therethrough substantially coaxial with the tube 80 in which is received an elongated cable end socket 93. Disposed at the opposite ends of the body 92 are counterweights 95 which have part-cylindrical outer surfaces which bear against the inner surface of the tube 80 and are fixedly secured thereto by mounting screws 96 which extend through complementary openings in the tube 80. Extending across the bore through the body 92 is at least one reticle wire 97, the image of which is illustrated as reflected in the mirror of FIG. 11, as will be explained more fully below.

Referring to FIGS. 4-6, the focus lens assembly 100 includes a lens 101 seated in an annular rubber shock mount 102, which is in turn disposed within a cylindrical lens holder 103 and, more particularly, is seated against a radially inwardly extending annular flange 104 integral with the lens holder 103 at the forward end thereof. A retaining ring 105 is seated in a complementary groove in the lens holder 103 and bears against the rear end of the shock mount 102 for cooperation with the flange 104 to securely hold the lens 101 in place. Threadedly engaged in radially extending holes through the lens holder 103 at diametrically opposed locations thereon are a pair of guide screws 106, the heads of which respectively extend outwardly through the focusing slots 88 in the tube 80. The slots 88 have a width very slightly greater than the diameter of the heads of the screws 106 so as to permit longitudinal movement of the focus lens assembly 100 with respect to the tube 80, while preventing rotational movement thereof.

Disposed in coaxial surrounding relationship with the rear end of the tube 80 is a cylindrical focus sleeve 110 which is comprised of a pair of half sleeves 111 joined together, as indicated in FIG. 6. The areas of the junctions of the half sleeves 111 define bearing bosses 112 having part-cylindrical inner bearing surfaces disposed in use in sliding engagement with the outer surface of the tube 80. Disposed adjacent to the outer end of the focus sleeve 110 and extending inwardly from the inner surface of each of the half sleeves 111 is a pair of helical walls 113 defining therebetween a helical channel 114. The helical channels 114 on the two half sleeves 111 slope in opposite directions and respectively receive therein the heads of the guide screws 106. Thus, it will be appreciated that as the focus sleeve 110 is rotated about the axis of the tube 80, the guide screws 106 are moved longitudinally in the slots 88, effecting a longitudinal movement of the focus lens assembly 100 for focusing thereof.

Formed adjacent to the inner end of the focus sleeve 110 and extending radially inwardly from the inner surface thereof are a pair of circumferentially extending annular walls 115 which form therebetween a circumferential channel for receiving the heads of the screws 96. Fixedly secured between suitable mounting flanges at the outer end of the focus sleeve 110 just beyond the rear end of the tube 80 is a rear window 116. Preferably, a rubber knurled hand grip 117 encircles the focus sleeve 110, being centered between circumferential bosses 118 thereon to hold the half sleeves 111 together and to facilitate manual rotation of the focus sleeve 110.

The tube 80 also carries adjacent to its forward end a toe projection assembly 120 (see FIG. 2) which is substantially identical to the track projection assembly 90, including a reticle assembly (not shown) and a focus lens assembly 130 (FIG. 10), which is substantially identical to the focus lens assembly 100. The focus lens assembly 130 includes guide screws 106, the heads of which are received through the slots 89 in the tube 80 and in the helical channels of the focus sleeve 110. The focus lens assembly 130 is so positioned that the focus sleeve 110 thereof does not project outwardly beyond the adjacent end of the tube 80 and, therefore, no end window is provided in the focus sleeve 110.

However, there is provided on the front end of the tube 80 a mirror assembly 140, illustrated in FIGS. 2, 10 and 11. The front end of the tube 80 terminates in a pair of diametrically spaced apart tabs 141, between which is disposed an elliptical mirror 142. More particularly, the mirror 142 is fastened to a flat bracket 143 having a pair of pivot ears 144 at the opposite sides thereof, respectively pivoted by screws 145 to the tube tabs 141. Integral with the bracket 143 at one end thereof is an adjustment tab 146 which is engaged with the free end of a bias leaf spring 147, which is secured to the wall of the tube 80 by screws 147a for resiliently biasing the mirror bracket 143 toward rotation in a clockwise direction, as viewed in FIG. 10, about the axis of the pivot screws 145. An adjustment screw 148 extends through a complementary opening in the tube 80 and bears against the opposite side of the adjustment tab 146, the adjustment screw 148 being securable against rotation by a lock nut 149. It will be appreciated that the adjustment screw 148 is screwed radially inwardly and outwardly to cooperate with the bias spring 147 to adjust the rotational position of the mirror bracket 143. When the desired adjustment is attained, the lock nut 149 is tightened to lock the mirror 142 in position.

Also carried by the front end of the tube 80 is a scale mount assembly 150 (FIG. 15), which includes a split cylindrical sleeve 151 which telescopically fits over the front end of the tube 80. The sleeve 151 is provided with a plurality of circumferentially spaced apart and radially inwardly extending ribs 152 (one shown in FIG. 10) which bear against the outer surface of the tube 80. The outer end of the sleeve 151 is closed by an end wall 153, and the split halves of the sleeve 151 are provided with clamp ears 154 which are secured together by screws 155 for tightening the sleeve 151 onto the tube 80. A cutout 156 is formed in the sleeve 151 to accommodate the adjustment screw 148 and lock nut 149 of the mirror assembly 140. As is illustrated in FIG. 3, there is formed in the outer surface of the sleeve 151 a recess for accommodating a bubble level 157. Also formed in the bottom of the sleeve 151 and projecting downwardly therefrom is a cylindrical window boss 158 in which is mounted a window 159, positioned to pass images reflected from the mirror 142.

Integral with the split sleeve 151 is a scale plate 160 which is disposed generally parallel to the mirror 142. Integral with the scale plate 160 and depending therefrom are two spaced-apart mounting arms 161. Referring to FIGS. 15-19, each of the mounting arms is provided with a detent boss 162, generally in the shape of a truncated pyramid, the mounting arms 161 being arranged so that the bosses 162 thereof are disposed in facing relationship. Each of the mounting arms 161 has a bore 163 extending therethrough, with the bores of the two arms 161 being coaxial. Mounted between the mounting arms 161 is a gauge tube 164 which is substantially square in transverse cross section, and is provided with indicia plates 165 respectively on each of the four faces thereof. The indicia plates 165 respectively bear scales in different units of measurement, such as millimeters, inches and degrees. The opposite ends of the gauge tube 164 are closed by end caps 166, each of which has a hollow rectangular plug portion 167 which fits telescopically within the adjacent end of the gauge tube 164, and is provided at its outer end face with a detent recess 168 shaped complementary to the detent bosses 162. Projecting outwardly from the center of the detent recess 168 axially thereof is a pivot pin 169.

In use, the mounting arms 161 are flexible and resilient. Thus, after the plugs 167 have been inserted in the ends of the gauge tube 164, the mounting arms 161 are flexed apart to accommodate insertion of the scale tube 164 therebetween, and the pivot pins 169 are respectively received in the bores 163. When the mounting arms 161 are released the detent bosses 162 seat within the detent recess 168. Thus, it will be appreciated that the gauge tube 164 is rotatable about the axis of the pivot pins 169 to four different detent positions defined by the mating pyramidal surfaces of the detent bosses and recesses 162 and 168. In each of these detent positions a different indicia plate 165 is disposed in a use position facing in substantially the same direction as the mirror 142.

Referring to FIGS. 1-4 and 14, the toe gauge assembly 50 also includes a fiber optic assembly 170 (see FIG. 4), which includes an elongated guide conduit 171 disposed within the tube 80 and held substantially coaxial therewith by suitable rubber washers 171a (see FIGS. 2 and 4). The opposite ends of the guide conduit 171 are respectively fitted over the cable end sockets 93 of the reticle assemblies 91. The guide conduit 171 has a raised, slotted mid portion 172 disposed in the tube housing 70 of the mounting bracket 51. The fiber optic assembly 170 also includes an elongated fiber optic cable 173 provided with a bifurcation ferrule 174 from which extend two bifurcated ends 175. The ferrule 174 is mounted in a bushing 176 which is fitted in a complementary opening in the bottom of the tube 80 and is fixedly secured thereto by means of a mounting plate 177 and associated mounting screws 177a (see FIG. 4). The bifurcated ends 175 of the fiber optic cable 173 extend into the slotted mid portion 172 of the guide conduit 171 and then respectively extend coaxially of the guide conduit 171 to the opposite ends thereof. Each of the bifurcated ends 175 is provided at its distal end with a plug 178 which plugs into the cable end socket 93 of the associated reticle assembly 91.

The fiber optic cable 173 is provided at its other end with a plug 179 (see FIG. 3) adapted to be plugged into a corresponding one of the receptacles 46 on the light source enclosure 40, the plug 179 having a circumferential groove 179a therein (see FIG. 14) for receiving the ball of the associated ball plunger 49 to hold the plug 179 in place in the receptacle 46. As can best be seen in FIG. 14, the plug 179 has a length such that when it is inserted into the receptacle 46 its inner end contacts the associated cam 47 and pushes it upwardly to its open condition, exposing the inner end of the plug 179 to the light from the lamp 41. It will be appreciated that the two plugs 179 from the two toe gauge assemblies 50 respectively plug into the two receptacles 46 on the light source enclosure 40, which is disposed remotely from the toe gauge assemblies 50. The fiber optic cable 173 preferably has a length of about eight feet from the plug 179 to the ferrule 174.

Figure 20:
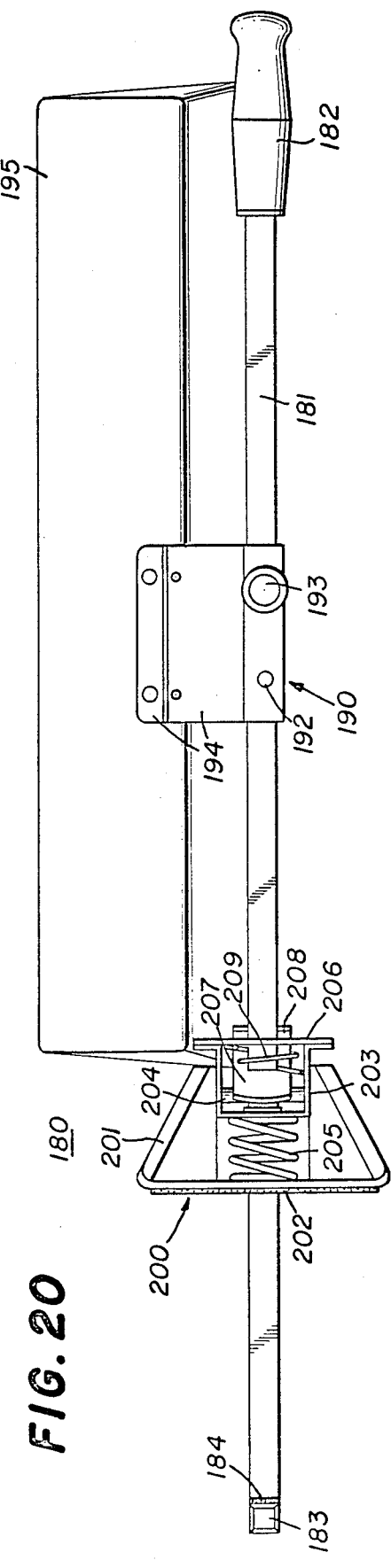
FIG. 20 is an enlarged top plan view of one of the track scale assemblies of the system of FIG. 1.
Figure 22:
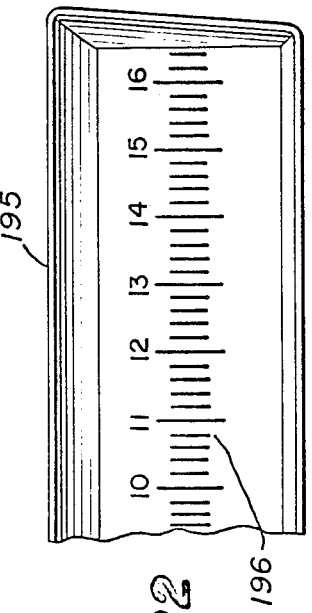
FIG. 22 is a fragmentary bottom plan view of the track scale assembly of FIG. 20.
Figure 21:
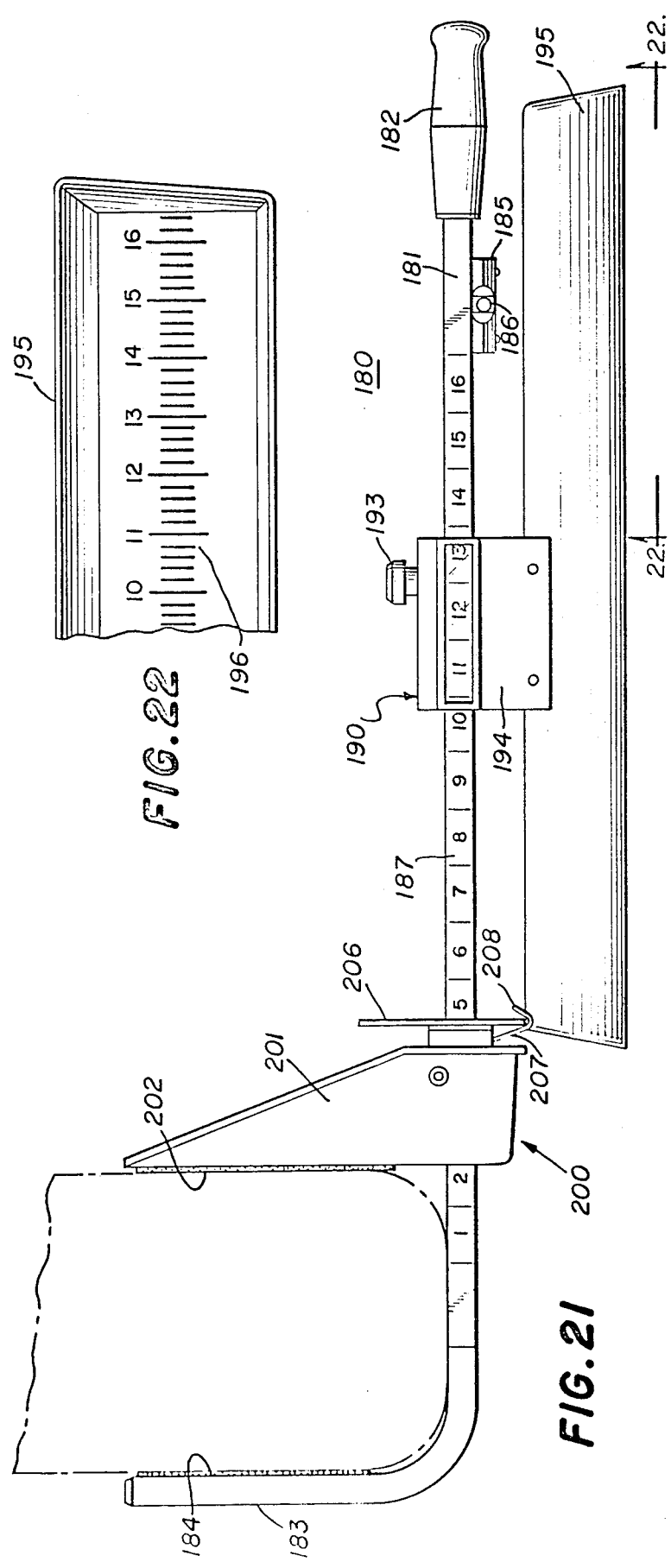
FIG. 21 is a rear elevational view of the track scale assembly of FIG. 20, illustrating its cooperation with an associated vehicle tire.

Referring now also to FIGS. 20-22, the measurement system 30 also includes a pair of track scale assemblies 180, which are constructed as mirror images of each other, wherefore only one will be described in detail. Preferably, the track scale assemblies 180 are generally of the type disclosed in U.S. Pat. No. 4,498,244, being of simplified construction in that they utilize only a single bar instead of two bars. More particularly, each of the track gauge assemblies 180 includes an elongated bar 181 substantially square in transverse cross section, being provided at one end thereof with a handle 182 and having at the other end thereof a clamp end 183 which extends substantially perpendicular to the longitudinal axis of the bar 181. A friction pad 184 of suitable material, such as sand paper or the like, may be adhered to the inner face of the clamp end 183. Secured to the bar 181 adjacent to the handle 182 is a retainer 185 carrying a bubble level 186. Scale indicia 187 may be formed along the top face of the bar 181.

The track gauge assembly 180 also includes a scale slider 190 which fits over the bar 181 for slidable movement therealong, the slider 190 being provided with a set screw 193 for locking it in position on the bar 181. Depending from the scale slider 190 are mounting flanges 194 to which are attached an elongated gauge dish 195 carrying suitable scale indicia 196 (FIG. 22).

The track gauge assembly 180 also includes a clamp slider 200 having a clamp shoe 201 which slidably receives the bar 181 through an aperture therein. The clamp shoe 201 may be provided with a friction pad 202 disposed in facing relationship with the friction pad 184 on the clamp end 183 of the bar 181. Mounted within the clamp shoe 201 is a generally U-shaped bracket 203, the bight portion of which has an opening receiving the bar 181 therethrough, and the legs of which are pivoted to the side walls of the shoe 201 by a mounting pin 204. A coil compression spring 205 is trapped between the bracket 203 and the clamp shoe 201 in surrounding relationship with the bar 181. A push washer plate 206 is fixedly secured to the distal ends of the legs of the brackets 203 and is disposed substantially perpendicular to the longitudinal axis of the bar 181 and slidably receives the bar 181 through an opening therein. A release lever 207 is disposed between the washer plate 206 and the shoe 201, and has an opening therein for slidably receiving the bar 181, the release lever 207 having a hook end 208 which hooks beneath the edge of the washer plate 206. A bias coil spring 209 surrounds the bar 181 between the washer plate 206 and the release lever 207.

In use, the associated vehicle wheel is clamped between the clamp end 183 of the bar 181 and the clamp shoe 201, appropriate movement of the shoe 201 being effected by manually squeezing the washer plate 206 and the release lever 207 together to accommodate free sliding movement of the clamp shoe 201. When the release lever 207 is released, it wedges against the bar 181 to prevent further sliding movement of the clamp shoe 201. The track gauge assembly 180 is clamped onto the front end of a rear wheel or the rear end of a front wheel so that the track gauge scale indicia face toward the opposite end of the vehicle 31. The track scale assembly 180 is mounted so that the bar 181 is horizontal, as indicated by the bubble level 186. The scale slider 190 is then appropriately positioned along the bar 181 with the aid of the scale indicia 187.

Referring now to FIG. 1, the operation of the measurement system 30 will be explained. First of all, it should be recognized that on many vehicles toe and track are set only on the front steerable wheels, while on other vehicles toe and track are set on all four wheels. For simplicity, the detailed operation of the system will be explained only in connection with the former arrangement in order to understand the operation of the system 30. Then a brief explanation of the four-wheel procedure will be given.

It will be appreciated that the toe gauge assemblies 50 will have been previously calibrated. In this regard, the eccentric collar 83 permits rotation of the tube 80 with respect to the mounting bracket 51 to align the longitudinal axis of the tube 80 parallel to the face of the magnet 55. When properly calibrated the toe projection beam 210 emitted from the window 159 will typically be substantially perpendicular to the longitudinal axis of the tube 80.

First of all, the toe of the front wheels 33 and 34 is measured. For this purpose, the toe gauge assemblies 50 are respectively mounted on the wheels 33 and 34, as illustrated in FIG. 1. More particularly, the wheel covers and dust caps are removed. Then each toe gauge assembly 50 is mounted on the associated wheel hub, with the magnet housing 52 against the hub and with the tube 80 disposed below the magnet housing 52 and oriented so that the toe projection assembly 120 is disposed toward the front of the vehicle 31. The tip 64 of a centering plunger is aligned in the centering hole (not shown) on the wheel spindle so that the magnet 55 centers on the hub face. The toe gauge assembly 50 is oriented so that the tube 80 is horizontal, as indicated by the bubble level 157.

When the toe gauge assemblies 50 have been thus mounted in place and properly aligned, the fiber optic cables 173 are plugged into the receptacles 46 on the light source enclosure 40, and the cord 42 is plugged in to energize the lamp 41. Thus light is transmitted through the fiber optic cables 173 to the track projection assemblies 90 and the toe projection assemblies 120. In each case, the light beam is emitted from the plug 178 into the cable end socket 93 and passes through the reticle assembly 91, forming an image of the reticle wire 97 which is then projected through the associated focus lens assembly 100 or 130, the focus lens assembly 100 emitting a track beam 211 and projecting it onto the associated track gauge assembly 180, and the toe projection assembly 120 emitting a toe beam 210 which is reflected from the mirror 142 and projected out through the window 159 onto the scale indicia plate 165 of the other one of the toe gauge assemblies 50. The position of the vertical image of the reticle wire 97 in the toe beam 210 on the opposite toe gauge indicia plate 165 gives a reading of the toe of the wheel from which the beam is projected.

The toe of the front wheels 33 and 34 is measured first. Initially, the toe projection beams 210 are focused by rotating the focus sleeves 110 in the manner described above. It will be appreciated that the scale tubes 164 will be rotated so that the appropriate one of the indicia plates 165 are facing the projection beam 210, in accordance with manufacturer's specifications.

In measuring toe the operator observes and records the toe beam reading on the scale indicia plate 165 of each of the toe gauge assemblies 50. The toe readings for the two wheels are then added to get the total toe. The individual and total toe readings are then compared with the vehicle manufacturer's specifications, and toe is then adjusted, as necessary, according to the manufacturer's procedures in a known manner until the toe gauge readings are within specifications.

Next, the track scale assemblies 180 are respectively mounted on the front portions of the rear wheels 37 and 38, as illustrated in FIG. 1, and as explained above. In particular, each track scale assembly 180 is positioned on its associated wheel so that the bar 181 is disposed horizontally, as indicated by the bubble level 186, and with the scale indicia 196 disposed about six inches below the vertical midplane of the wheel and parallel to the axis of rotation thereof.

Many cars have either a positive or a negative camber setting on the front wheels, camber being the angle between the plane of the wheel and vertical. The measurement system 30 can compensate for a positive or negative camber setting so as to provide a vertical projected reticle line image from the toe projection assembly 120. When the toe gauge assembly 50 is mounted on a wheel with a non-zero camber setting, the operator can rotate the tube 80, as described above, to maintain a vertical image line projected to the track scale 196 on the associated track gauge assembly 180, as explained below.

The track of the front wheels 33 and 34 is read by observing and recording the positions of the track beams 211 on the track gauge indicia 196. If the track readings are the same for both wheels, then front track is properly set, if not, the operator adds the two track readings to get the total track figure for the front wheels and then divides that total by two to get the correct setting for each wheel. Then track is adjusted as necessary in a known manner.

It is a fundamental aspect of the present invention that the fiber optic assembly 170 results in the projection of bright, high intensity light beams which can easily be read by the operator, even in daylight. The bifurcated fiber optic cable 173 permits simultaneous illumination of both the track and toe projection assemblies 90 and 120 in each of the toe gauge assemblies 50, thereby obviating any switching of the light source between projection assemblies, as has been necessary with certain prior devices. Furthermore, because the light source enclosure 40 is disposed in a remote location, the toe gauge assemblies 50 are effectively isolated from the heat of the lamp 41, thereby minimizing heat distortion of the projected images and changes in calibration of the toe gauge assembly 50 as a result of thermal stresses in the materials.

On vehicles for which toe and track are specified for all four wheels, they are first checked on the rear wheels. First of all, the rear toe is measured by mounting the toe gauge assemblies 50 on the rear wheels and orienting them substantially in the manner described above, but with the toe projection assemblies 120 disposed toward the rear of the vehicle 31. In this case, the toe scales are reversed so that "toe-in" becomes "toe-out" and vice versa. The toe gauge assemblies 50 are connected to the light source enclosure 40 and the toe projection beams 210 are focused in a manner described above. Then the operator reads and records the toe for each wheel, calculates total toe, compares the individual and total toe readings with the vehicle manufacturer's specifications and adjusts toe as necessary, all as explained above, except that the toe adjustments on the rear wheels are effected in a different but well-known manner.

The operator may then calculate the thrust angle of the vehicle. The operator reads and records the toe for each wheel, adds the two toe readings and divides by two to get the thrust angle. This angle is then compared with manufacturer's specifications and, if necessary, the manufacturer's adjustment procedure, if any, is followed.

After the rear wheel toe has been adjusted tracking is checked by holding a calibrated straight edge horizontally against a point on the vehicle frame or body near the front of the vehicle, making sure that it is held at a right angle to the track projection beam 211 emitted from the rear of the associated toe gauge assembly 50. The operator notes the measurement line on the straight edge at which the reticle line of the track projection beam 211 appears, records the measurement and repeats the procedure on the other side of the vehicle 31. If the two side-to-side measurements are equal, track is properly set. If not, and if rear track is adjustable on the vehicle, the operator adds the two track readings together to get total track for the rear wheels 37 and 38, divides the total by two to get the correct track setting for each wheel, and adjusts track in accordance with the vehicle manufacturer's toe adjustment procedures.

Once the rear wheel toe and track have been set, then the front wheel toe and track are measured and adjusted in the manner described above.

In a constructional model of the measurement system 30, the mounting brackets 51 are formed of cast aluminum and the tube 80 and the gauge tube 164 are formed of anodized aluminum. The focus sleeves 110 are formed of acrylonitrile butadiene styrene, and the scale mount assemblies 150 are formed of a suitable plastic material, such as that sold by E.I. DuPont de Nemours & Co. under the trademark "ZYTEL".

From the foregoing, it can be seen that there has been provided an improved optical toe/track measurement system which provides high-intensity measurement beams and is extremely accurate and free of thermal distortion and is characterized by a simple and economical construction and ease of operation.

We claim:

1. Apparatus for measuring wheel alignment of a motor vehicle comprising: light projection means; means for mounting said light projection means on one wheel of the vehicle in a predetermined position and orientation; scale means mountable on another wheel of the vehicle; a light source remote and substantially thermally isolated from said projection means; and fiber optic means for transmitting light from said source to said projection means, said projection means being responsive to light from said fiber optic means for forming a light beam and projecting it onto said scale means.

2. The apparatus of claim 1, wherein said scale means is mountable on another wheel at the same end of the vehicle as said one wheel.

3. The apparatus of claim 1, wherein said scale means is mountable on another wheel on the same side of the vehicle said one wheel.

4. The apparatus of claim 1, wherein said light projection means includes a reticle and a focusing lens and focusing means for moving said focusing lens to focus the light beam.

5. The apparatus of claim 1, and further comprising a second light projection means mounted on said one wheel, and a second scale means, said two scale means being respectively mountable on other wheels at the same end and on the same side of the vehicle, respectively, as said one wheel, said fiber optic means including a fiber optic cable having a first end optically coupled to said source and a second bifurcated end optically coupled to both of said projection means for forming two light beams and projecting them respectively onto said two scale means.

6. The apparatus of claim 5, wherein one of said projection means includes mirror means for directing the associated light beam across the end of the vehicle to the scale means on the other wheel at the same end of the vehicle as said one wheel, and means for adjusting the inclination of said mirror means.

7. Apparatus for measuring wheel alignment of a motor vehicle comprising: an elongated housing having a longitudinal axis; means for mounting said housing on one wheel of the vehicle with said longitudinal axis disposed substantially horizontally and substantially perpendicular to the axis of rotation of said one wheel; projection means disposed within said housing; scale means mountable on another wheel of the vehicle; a light source remote and substantially thermally isolated from said housing; and means for transmitting light from said source to said projection means, said projection means being responsive to light from said transmitting means for forming a light beam and projecting it onto said scale means.

8. The apparatus of claim 7, wherein said light transmitting means includes a fiber optic cable.

9. The apparatus of claim 8, and further comprising an enclosure for said light source, and receptacle means on said enclosure, said fiber optic cable having plug means at one end thereof for plugging into said receptacle means to provide an optical coupling between said light source and said fiber optic cable.

10. The apparatus of claim 9, wherein said enclosure includes cover means mounted for movement between a normal closed position blocking passage of light through said receptacle means and an open position permitting passage of light from said source through said receptacle means, said cover means being moved from the closed position to the open position thereof in response to insertion of said plug means into said receptacle means.

11. The apparatus of claim 7, and further comprising means accommodating limited rotation of said housing about its longitudinal axis with respect to said mounting means.

12. The apparatus of claim 11, and further comprising eccentric means for accommodating rotational movement of said housing eccentrically with respect to the longitudinal axis thereof.

13. Apparatus for measuring wheel alignment of a motor vehicle comprising: an elongated housing having a longitudinal axis; means for mounting said housing on one wheel of the vehicle with said longitudinal axis disposed substantially horizontally and substantially perpendicular to the axis of rotation of said one wheel; two projection means disposed within said housing; two scale means mountable respectively on other wheels at the same end and on the same side of the vehicle, respectively, as said one wheel; a single light source remote and substantially thermally isolated from said housing; and means for transmitting light from said source to each of said projection means, said two projection means being responsive to said light from said transmitting means for respectively forming two light beams and projecting them respectively onto said two scale means.

14. The apparatus of claim 13, wherein said transmitting means includes a fiber optic cable having one end thereof optically coupled to said light source and having the other end thereof bifurcated and optically coupled to each of said projection means.

15. The apparatus of claim 13, wherein each of said projection means includes reticle means and a focusing lens and focusing means for effecting movement of said focusing lens for focusing the associated light beam.

16. The apparatus of claim 13, wherein said two light beams are coaxial within said housing.

17. A system for measuring wheel alignment of a motor vehicle comprising: two elongated housings each having a longitudinal axis; means for mounting said housings respectively on two wheels at the same end of the vehicle with said longitudinal axes disposed substantially horizontally and respectively substantially perpendicular to the axes of rotation of said two wheels; first and second projection means respectively disposed in said two housings; first and second scale means respectively carried by said housings; a single light source remote and substantially thermally isolated from said housings; and means for transmitting light from said source to said first and second projection means, said first and second projection means being responsive to said light from said transmitting means for respectively forming first and second light beams and projecting them respectively onto said second and first scale means.

18. The system of claim 17, and further comprising third and fourth projection means respectively disposed in said two housings; third and fourth scale means respectively mountable on the other two wheels of the vehicle; said transmitting means including means for transmitting light from said source to said third and fourth projection means, said third and fourth projection means being responsive to said light from said transmitting means for respectively forming third and fourth light beams and projecting them respectively onto said third and fourth scale means.

19. The system of claim 17, wherein said light transmitting means includes two fiber optic cables for transmitting light from said source respectively to said housings.

20. The system of claim 18, wherein said light transmitting means includes two fiber optic cables for transmitting light from said source respectively to said housings, each of said fiber optic cables having one end thereof optically coupled to said light source and having the other end thereof bifurcated and optically coupled to each of the two projection means disposed in the associated housing.

* * * * *